United States Patent Office 2,703,328
Patented Mar. 1, 1955

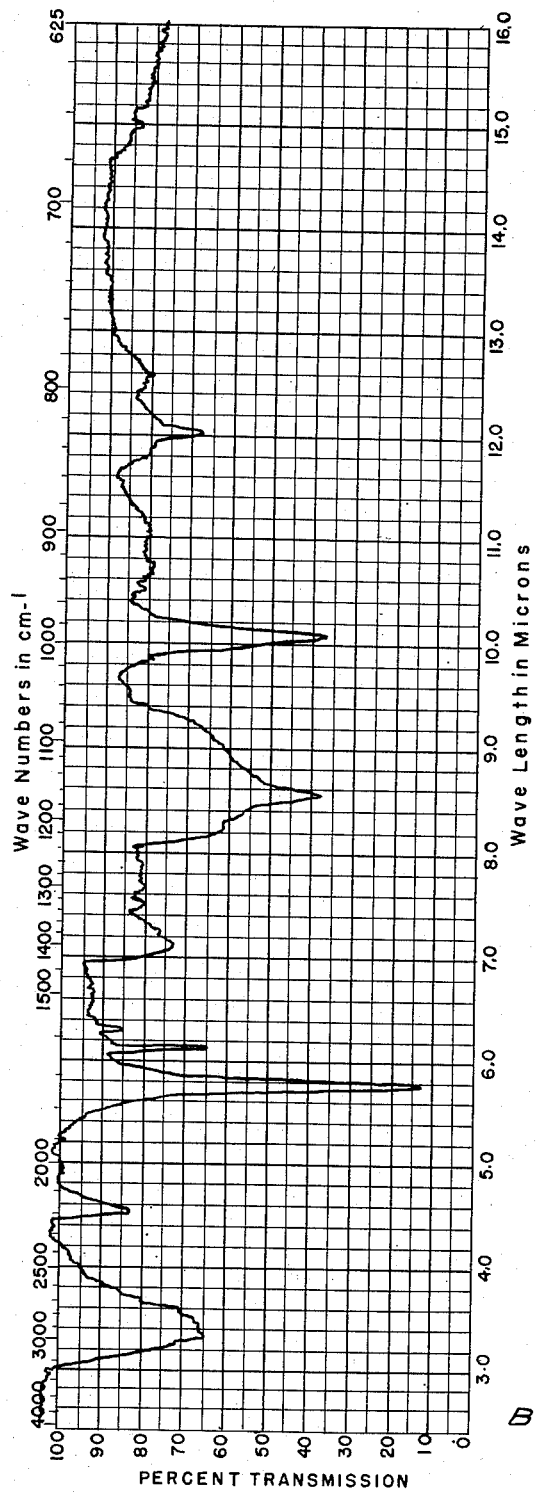
FIG. I.
INVENTOR
WALTER D. CELMER
BY Arthur G. Connolly
HIS ATTORNEY

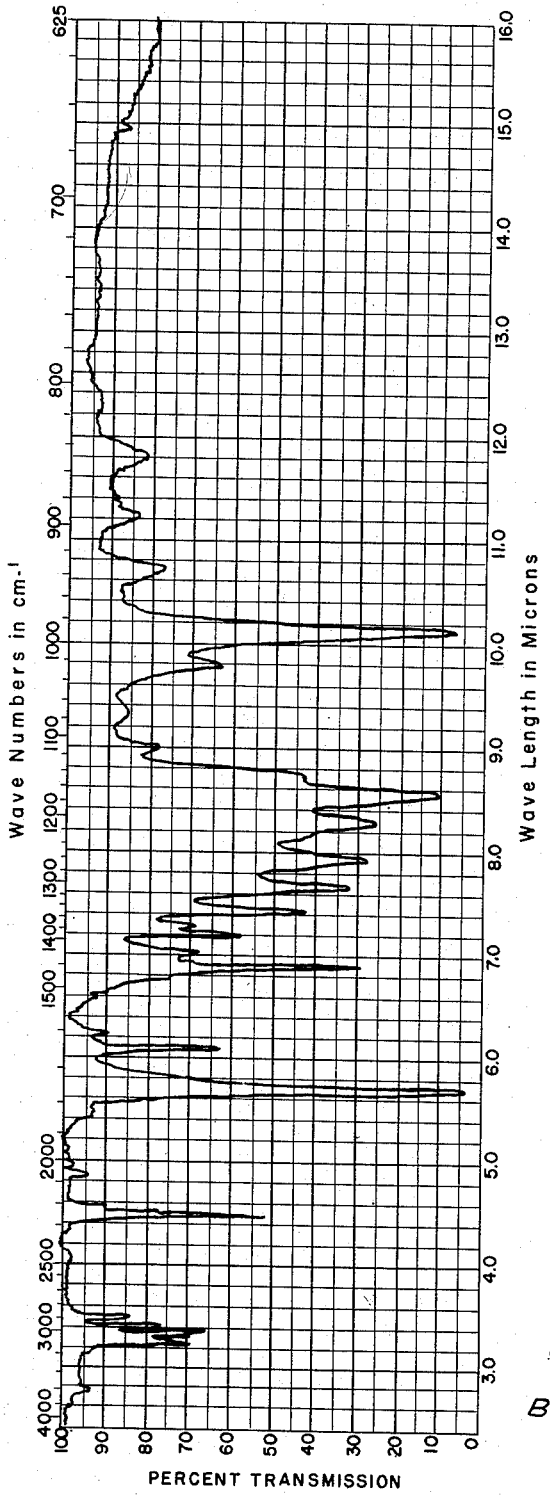

2,703,328

REARRANGEMENT PRODUCTS OF MYCOMYCIN

Walter D. Celmer, Glen Oaks, N. Y., assignor to Chas. Pfizer & Co., Inc., Brooklyn, N. Y., a corporation of Delaware Application August 4, 1951, Serial No. 240,365

7 Claims. (Cl. 260—405.6)

This invention is concerned with certain novel anti-bacterially active compounds and methods of preparing such compounds. In particular it is concerned with the conversion or rearrangement of mycomycin to form new and improved antibiotic products.

Mycomycin is a known biologically active material which is generally prepared by the growth of Nocardia acidophilus in suitable fermentation media. Although mycomycin has been shown to be effective against many disease-producing organisms both in vitro and in vivo, it suffers from the serious deficiency of very low stability. Various expedients have been resorted to to slow its decomposition. One example of these is treatment with protein-like materials (see a copending application by Ben A. Sobin, Serial No. 150,353, filed on March 17, 1950, which is now abandoned).

It has now been found that mycomycin may be converted, i. e. its molecular structure rearranged, by a certain chemical treating process to form a new compound which is apparently an isomer of mycomycin. This isomer in turn may be variously treated to prepare derivatives thereof. Surprisingly enough, this isomer and its derivatives, such as its salts and esters, are biologically active in themselves. Not only that but they are definitely more stable than the parent antibiotic, mycomycin per se.

Broadly speaking, the preparation of the new isomeric compound is brought about by contacting mycomycin with an aqueous solution of a water-soluble alkali. Especially useful alkalies are the alkali metal hydroxides like sodium hydroxide, potassium hydroxide and lithium hydroxide. Thus, according to a preferred embodiment of this process, mycomycin is dissolved in an aqueous alkali metal hydroxide solution. In the course of this alkaline digestion, the mycomycin is isomerized and reacts with the alkali metal, so that a metal salt of the isomer is produced. One may use the resulting solution directly as such. However, it is preferable generally at least to concentrate it or to isolate the product in solid form. The recovered salt may then be utilized or the free isomer or other derivatives prepared therefrom. Thus, one may concentrate the solution under vacuum or dry it from the frozen state. Formation of a crystalline product is a usually preferred procedure.

The aqueous solution should best be quite dilute, as to both mycomycin and alkali contents. Greatest success is achieved with the latter at concentrations of less than about 2.5 normal and preferably from about 0.5 to about 2.0 normal. If a higher proportion of the alkali is used, the product tends to be less pure, and obviously with below about 0.5 N the isomerization is less effective and/or slower. The mycomycin content of the solution is also most suitably maintained at a low level. In practical operation the lower limits are naturally established by the solubility in water of the particular metal salt of the new product which is to be formed. The solubility of mycomycin itself must also be considered, of course. Generally concentrations of about 10% or less by weight of mycomycin are employed, and a range of between about 0.5% and 5.0% by weight is preferred.

The reaction is best run at about room temperature, that is, from about 15° C. to about 30° C. Higher temperatures do not accelerate the digestion sufficiently to justify the cost of heating, while lower temperatures slow the reaction to an impractical extent. At 0° C., for instance, no product is obtained in an hour, but upon warming the same mixture to room temperature, the product soon separates. The treatment is facilitated if carried out in a carbon dioxide-free atmosphere, since carbon dioxide tends to combine with some alkali and thus may interfere with the reaction.

In a specific and preferred method of effecting the isomerization reaction, relatively pure crystalline mycomycin is dissolved in a dilute caustic solution and allowed to stand at about room temperature. Crystals of the alkali salt of the new compound generally start to separate within about 5 to 15 minutes when the hereinabove mentioned, most suitable concentrations of mycomycin and caustic are used. The reaction is usually complete within about an hour, after which the product may be removed by conventional means, such as filtration or centrifugation. During the reaction, the solution darkens considerably, but the crystals formed are light colored or white. They may be recrystallized to improve purity, if such is required. For instance, the sodium salt product is quite soluble in methanol and less so in ethanol, so that it may be recrystallized from mixtures of these solvents. Finally, the free isomer may be prepared from the metal salt, or its ester or other derivatives.

The exact chemical structures of the new products are as yet unknown, but it has been determined that the mycomycin isomer is a highly unsaturated, monocarboxylic acid with the empirical formula $C_{13}H_{10}O_2$. The structure of this isomycomycin is now believed to be

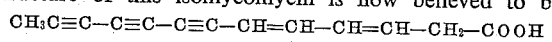

and the compound has been assigned the name 3,5-tridecadiene-7,9,11-triynoic acid. Various metallic salts thereof are recovered directly from treatment of mycomycin in an aqueous solution of the hydroxide of the preferred metal, as previously indicated. Alternatively, the same or other metallic salts may be made from the free acid form of the new compound. This acid in turn may be prepared by acidifying the aqueous solution or suspension of one of its metallic salts, e. g., the sodium salt. The acid can readily be converted to various other salts with metals or with organic bases, e. g. by simple neutralization. Such carboxylic derivatives as esters or amides have also been produced by known procedures.

Examples of the biological activity of two of the new products of this invention are indicated by the tables below:

Table I.—Tuberculostatic activity against Mycobacteria tuberculosis

|  | Sensitivity in Dubos broth (mcgs./cc.) | | | |
|---|---|---|---|---|
|  | #2678 | | Munday[1] | |
|  | 7 days | 11 days | 7 days | 11 days |
| Free acid | 16 | 16 | 16 | 16 |
| Methyl ester | 4 | 63 | 2 | 4 |

[1] Streptomycin resistant strain.

Table II.—Effect on growth of certain Mycobacteria in conventional media

|  | Conc. Range in Media Micrograms/ml. | ranae | phlei | smegmatis | #607 |
|---|---|---|---|---|---|
| Free Acid | 10–100 | — | — | — | — |
| Methyl Ester | 1–10 | — | — | — | — |

— Indicates no growth of the organism in the designated concentration ranges.

The new compound, or its salt or like derivative, is definitely more stable than is known mycomycin. The free acid gradually darkens at room temperature, but it may be kept unchanged for long periods of time by storage at about 5° C. in an inert atmosphere. It can be crystallized from mixtures of ether and hexane or from other conventional solvents and combinations thereof, and forms long white needles which decompose slowly when heated to above 100° C. This compound displays strong bands in the ultraviolet absorption spectrum at 260 and 270 m$\mu$ and weaker bands at 290, 307, 327 and 348 m$\mu$. The new acid and its methyl ester have characteristic infrared spectra. Some of the characteristic maxima of the acid (in reciprocal centimeters) are: 2200, 1740, 1635, 1580, 1410, 1333, 1302, 1212, 1170, 991, 832. Some of the characteristic maxima of the methyl ester are: 2230, 1755, 1640, 1590, 1450, 1425, 1385, 1370, 1343, 1295, 1255, 1207, 1168, 1108, 1063, 1018, 984, 932, 890, 847. Figures I and II give the infrared absorption curves between 625 and 4000 cm.$^{-1}$ of respectively the acid in dioxane and methyl ester in carbon tetrachloride. The compounds absorb eight equivalents of hydrogen when subjected to catalytic hydrogenation. The crystalline acid is readily soluble in ether, ethanol, dioxane, ethyl acetate and glacial acetic acid. It is slightly soluble in benzene, toluene, xylene, chloroform, methylene chloride, carbon tetrachloride and carbon disulfide. It is practically insoluble in hexane and petroleum ether. The crystalline methyl ester possesses even greater solubility in the above solvents than does the free acid. The alkali metal salts are quite soluble in water but are less so in the presence of their corresponding metallic hydroxide or sulfate. Other water-soluble inorganic salts tend to force the corresponding metallic salt of the new poduct out of solution.

The following examples are given by way of illustration and are not to be considered as the only manner in which this invention may be embodied. It is to be understood that protection of this novel concept is limited solely by the specific wording of the appended claims.

*Example I*

One hundred milligrams of crystalline mycomycin in 5 ml. of cold water was treated by the slow addition of 5 ml. of 1-normal sodium hydroxide. A clear solution formed which gradually darkened on standing at room temperature. In about 5 to 10 minutes white crystals started to separate. After a total of 20 minutes the product was filtered under an atmosphere of nitrogen. The crystals were washed with a small volume of cold water and dried at room temperature in an inert atmosphere. Twenty-five mg. of the sodium salt of the mycomycin isomer were obtained. This product was recrystallized from a mixture of methanol and ethanol and recovered as small white needles.

*Anal.*—Calc. for $C_{13}H_9O_2Na$: Mol. wt., 221. Found (by titration): 220, 223.

*Example II*

Four hundred milligrams of the sodium salt prepared as in Example I were added to 50 ml. of water. The mixture was stirred and the pH was adjusted to 2.0 with dilute hydochloric acid. An amorphous precipitate separated, consisting of the free acid form of the isomeric mycomycin. This was filtered, washed with a small volume of water and dried under nitrogen. (Alternatively the product may be extracted with ether and the ether layer dewatered with anhydrous sodium sulfate and evaporated to dryness.) A yield of about 80 to 90% was realized. The crystalline acid was obtained by dissolving the amorphous product in ether and cautiously adding hexane. Long white needles were thus formed, stable for months at refrigerator temperatures in sealed containers, unlike known mycomycin.

*Anal.*—Calc. for $C_{13}H_{10}O_2$: C, 78.79; H, 5.05. Found: C, 78.87; H, 5.43.

*Example III*

One gram of the sodium salt of the new isomer of mycomycin was added to 100 ml. of water. The mixture was stirred while the pH was adjusted to 2.0 with dilute hydrochloric acid.

The resulting precipitate was extracted into ether; the ether layer was collected and dried with anhydrous sodium sulfate. The dry ether solution at 5° C. was treated with an ethereal solution of diazomethane (slight excess over the theoretical amount) and allowed to stand at 5° C. for 20 minutes. The solution was then evaporated to dryness to give a light colored crystalline residue, weighing 800 mg. This product was a methyl ester of the new mycomycin isomer. Although already pure enough for most purposes, it could be recrystallized from hexane or closely related petroleum ether solvents to give long silky needles. The ester material is also extremely stable at refrigerator temperatures when sealed. It is stable even at room temperature for a number of days. It possesses a sharp melting point of 69–70° C. (micro hot stage). The melt recrystallizes on cooling and remelts at the same 69–70° C.

*Anal.*—Calcd. for $C_{14}H_{12}O_2$: C, 79.24; H, 5.66; $OCH_3$, 14.62. Found: C, 79.47; H, 5.82; $OCH_3$, 14.34.

What is claimed is:

1. A process for preparing a biologically active compound which comprises contacting mycomycin at a temperature from about 15° C. to about 30° C. with an aqueous solution of a water-soluble alkali.

2. A process as claimed in claim 1 wherein the alkali is an alkali metal hydroxide and has a concentration in the solution of less than about 2.5 normal.

3. A process for preparing a biologically active compound isomeric with mycomcin, which comprises dissolving up to about 10% by weight of mycomycin in an aqueous solution containing a water-soluble alkali metal hydroxide in a concentration of substantially between 0.5 and 2.0 normal, allowing the mixture to stand at room temperature for at least about five minutes and recovering the crystalline product thereby precipitated.

4. A substance selected from the group consisting of a biologically active, highly unsaturated, organic acid, isomeric with mycomycin and having the formula $C_{13}H_{10}O_2$, named 3,5-tridecadiene-7,9,11-triynoic acid and having the apparent structure $$CH_3C{\equiv}C-C{\equiv}C-C{\equiv}C-CH{=}CH-CH{=}CH-CH_2-COOH$$

which displays strong ultraviolet absorption maxima at 260 and 270 m$\mu$, exhibits characteristic infrared absorption maxima (expressed in reciprocal centimeters) as follows: 2200, 1740, 1635, 1580, 1410, 1333, 1302, 1212, 1170, 991, 832, is but slightly soluble in water, is readily soluble in ether, ethanol, dioxane and glacial acetic acid, and as a methyl ester has a melting point of 69–70° C., and the salts and esters of said acid.

5. A methyl ester of the organic acid claimed in claim 4.

6. An alkali metal salt of the organic acid claimed in claim 4.

7. A biologically active, highly unsaturated, organic acid, isomeric with mycomycin and having the formula $C_{13}H_{10}O_2$, named 3,5-tridecadiene-7,9,11-triynoic acid and having the apparent structure $$CH_3C{\equiv}C-C{\equiv}C-C{\equiv}C-CH{=}CH-CH{=}CH-CH_2-COOH$$

which displays strong ultraviolet absorption maxima at 260 and 270 m$\mu$, exhibits characteristic infrared absorption maxima (expressed in reciprocal centimeters) as follows: 2200, 1740, 1635, 1580, 1410, 1333, 1302, 1212, 1170, 991, 832, is but slightly soluble in water, is readily soluble in ether, ethanol, dioxane and glacial acetic acid, and as a methyl ester has a melting point of 69–70° C.

References Cited in the file of this patent

Gardner et al., article in Brit. J. Exptl. Path., vol. 23, page 123, 1942.

Johnson et al., article in Jour. of Bact., vol. 54, September 10, 1947, page 281.

Baron, "Handbook of Antibiotics," pages 202 to 204, published 1950 by Reinhold Publishing Corporation, New York City.